United States Patent
Park et al.

(10) Patent No.: US 12,157,516 B2
(45) Date of Patent: Dec. 3, 2024

(54) CASTING VEHICLE BODY STRUCTURE

(71) Applicants: Hyundai Motor Company, Seoul (KR); Kia Corporation, Seoul (KR)

(72) Inventors: Taeou Park, Seoul (KR); Seongwook Seo, Hwaseong-si (KR); Mun Soo Cha, Suwon-si (KR); Heeju Kim, Yongin-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 338 days.

(21) Appl. No.: 17/830,629

(22) Filed: Jun. 2, 2022

(65) Prior Publication Data

US 2023/0211825 A1     Jul. 6, 2023

(30) Foreign Application Priority Data

Jan. 6, 2022  (KR) .................. 10-2022-0002373

(51) Int. Cl.
 *B62D 25/08* (2006.01)
 *B62D 21/11* (2006.01)
 *B62D 29/00* (2006.01)
 *B62D 21/15* (2006.01)

(52) U.S. Cl.
 CPC .............. *B62D 25/08* (2013.01); *B62D 21/11* (2013.01); *B62D 25/088* (2013.01); *B62D 29/008* (2013.01); *B62D 21/157* (2013.01)

(58) Field of Classification Search
 CPC .... B62D 25/00; B62D 25/08; B62D 25/2018; B62D 25/088; B62D 29/00; B62D 29/008; B60Y 2304/05
 USPC ..... 296/203.01–2, 198, 204, 193.09, 29, 30, 296/187.12
 See application file for complete search history.

(56) References Cited

FOREIGN PATENT DOCUMENTS

JP      H06329050 A  * 11/1994
KR    20210035460 A  *  4/2021

OTHER PUBLICATIONS

JP06-329050 Text (Year: 1994).*
KR 20210035460 TEXT (Year: 2021).*

* cited by examiner

*Primary Examiner* — Dennis H Pedder
(74) *Attorney, Agent, or Firm* — Slater Matsil, LLP (57) ABSTRACT

An embodiment casting vehicle body structure includes a fender apron upper member, a shock absorber housing disposed under the fender apron upper member, a front side member disposed under the shock absorber housing, a side member runner protruding from an inner surface of the front side member, and a side member rib protruding from the side member runner.

20 Claims, 13 Drawing Sheets

|  | General casting vehicle body | Casting vehicle body structure of exemplary embodiment |
|---|---|---|
| Thickness of casting plate(mm) | 3.5 | 2.5 (-1.0) |
| Weight(g) | 358 | 357(-1g) |
| Maximum displacement($10^{-2}$mm) | 1.95 | 1.83 (6.2%↓) |
| Principal stress($10^7$N·m) | 2.36 | 2.25 (4.7%↓) |

CASTING VEHICLE BODY STRUCTURE

CROSS-REFERENCE TO RELATED APPLICATIONS

This application claims the benefit of Korean Patent Application No. 10-2022-0002373, filed on Jan. 6, 2022, which application is hereby incorporated herein by reference.

TECHNICAL FIELD

The present invention relates to a casting vehicle body structure.

BACKGROUND

The front structure of the vehicle body is an important skeletal longitudinal member of the vehicle body and is a major factor determining the basic strength of the vehicle body.

The front structure of the vehicle body protects the occupant in case of a frontal collision of the vehicle, supports power train parts and chassis parts, such as suspension and steering, and supports the front bumper beam, the FEM (front end module) and the battery in front of the vehicle body.

A plurality of mass-produced vehicles is designed and produced in a monocoque method of welding and joining steel panels.

A typical monocoque front apron member structure has problems in that more than 70 steel panels must be produced and assembled individually, so mold cost is burdened, the manufacturing process is complicated, and production cycle time is required.

This method may be suitable for the development of a mass production vehicle type, for example, more than about 100,000 vehicles per year, but it is difficult to apply to the development of a small production vehicle type, for example, less than about 1,000 vehicles per year.

When an 'aluminum space frame' structure suitable for small-volume production is applied, the layout of parts such as the shock absorber housing becomes complicated, and when high vacuum die-casting parts are applied, the investment cost is high.

In vehicle manufacturing, the engine cylinder block, the cylinder head, the crankshaft, etc. are produced using the casting method, and the casting method is also applied to major members such as the front shock absorber housing and the rear side member in the vehicle body, which is produced in small quantities.

The above information disclosed in this background section is only for enhancement of understanding of the background of the invention, and therefore it may contain information that does not form the prior art that is already known to a person of ordinary skill in the art.

SUMMARY

The present invention relates to a casting vehicle body structure. Particular embodiments relate to a casting vehicle body structure capable of minimizing a number of parts and securing strength.

Embodiment of the present invention provide a casting vehicle body structure that may minimize the number of parts and secure strength.

A casting vehicle body structure according to an exemplary embodiment of the present invention may include a fender apron upper member, a shock absorber housing disposed under the fender apron upper member, and a front side member disposed under the shock absorber housing, and on the front side member, a side member runner is formed to protrude from its inner surface, and a side member rib is formed to protrude from the side member runner.

A suspension upper arm mounting part may be formed on the front side member, the side member runner may include a mounting part runner formed to protrude from the inner surface of the suspension upper arm mounting part, and the side member rib may include a mounting part rib formed to protrude from the mounting part runner.

The mounting part runner and the mounting part rib may be formed in a lateral direction perpendicular to the length direction of the front side member.

The mounting part runner and the mounting part rib may be formed and connected along a lateral direction perpendicular to the length direction of the front side member.

The side member runner may include a side member lateral direction runner formed in a lateral direction vertical to the length direction of the front side member on the inner surface of the front side member, and the side member rib may include a side member lateral direction rib formed to protrude on the side member lateral direction runner.

The side member lateral direction runner and the side member lateral direction rib may be formed and connected along a lateral direction perpendicular to the length direction of the front side member.

The side member runner may further include a side member longitudinal direction runner formed to protrude from the inner surface of the front side member along the length direction of the front side member, and the side member rib may further include a side member longitudinal direction rib formed to protrude on the side member longitudinal direction runner.

The casting vehicle body structure according to an exemplary embodiment of the present invention may further include an upper arm mounting part reinforcement plate formed to protrude adjacent to the suspension upper arm mounting part.

The casting vehicle body structure according to an exemplary embodiment of the present invention may further include an upper member runner formed to protrude from the inner surface of the fender apron upper member.

The upper member runner may include an upper member longitudinal direction runner formed to protrude along the length direction of the fender apron upper member.

The upper member runner may further include an upper member lateral direction runner formed and connected along a lateral direction vertical to the length direction of the fender apron upper member.

The casting vehicle body structure according to an exemplary embodiment of the present invention may further include a housing runner formed to protrude from the inner surface of the shock absorber housing.

The casting vehicle body structure according to an exemplary embodiment of the present invention may further include a housing runner formed to protrude from the inner surface of the shock absorber housing and connecting the upper member runner and the side member runner.

The housing runner may be formed in two along both sides of the shock absorber housing, and the casting vehicle body structure may further include a housing connection runner formed to connect each of the housing runners.

The fender apron upper member, the shock absorber housing and the front side member may be integrally formed.

According to the casting vehicle body structure according to an exemplary embodiment of the present invention, it is possible to secure strength while minimizing the number of parts.

According to the casting vehicle body structure according to an exemplary embodiment of the present invention, cost competitiveness of a small-volume production vehicle type may be secured by using a casting method.

According to the casting vehicle body structure according to an exemplary embodiment of the present invention, it is possible to implement a high strength vehicle body structure.

In addition, according to the casting vehicle body structure according to an exemplary embodiment of the present invention, it is possible to minimize the assemble connection structure between parts, and to assemble several peripheral parts simultaneously, and to simplify the layout.

In addition, the effects that can be obtained or predicted by exemplary embodiments of the present invention will be disclosed directly or implicitly in the detailed description of the exemplary embodiments of the present invention. That is, various effects predicted according to exemplary embodiments of the present invention will be disclosed within a detailed description to be described later.

BRIEF DESCRIPTION OF THE DRAWINGS

Since these drawings are for reference in describing exemplary embodiments of the present invention, the technical spirit of the present invention should not be construed as being limited to the accompanying drawings.

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly explain embodiments of the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to those shown in the drawings, and the thicknesses are enlarged to clearly express various parts and regions.

In addition, in the detailed description below, the reason for dividing the names of components into first, second, etc. is to classify them in the same relationship, and it is not necessarily limited to the order in the following description.

Throughout the specification, when it is said that a certain part includes certain constituent elements, this means that other constituent elements may be further included, rather than excluding other constituent elements, unless specifically stated otherwise.

In addition, terms such as . . . part, . . . described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Exemplary embodiments of the present invention will hereinafter be described in detail with reference to the accompanying drawings.

Figure 1:
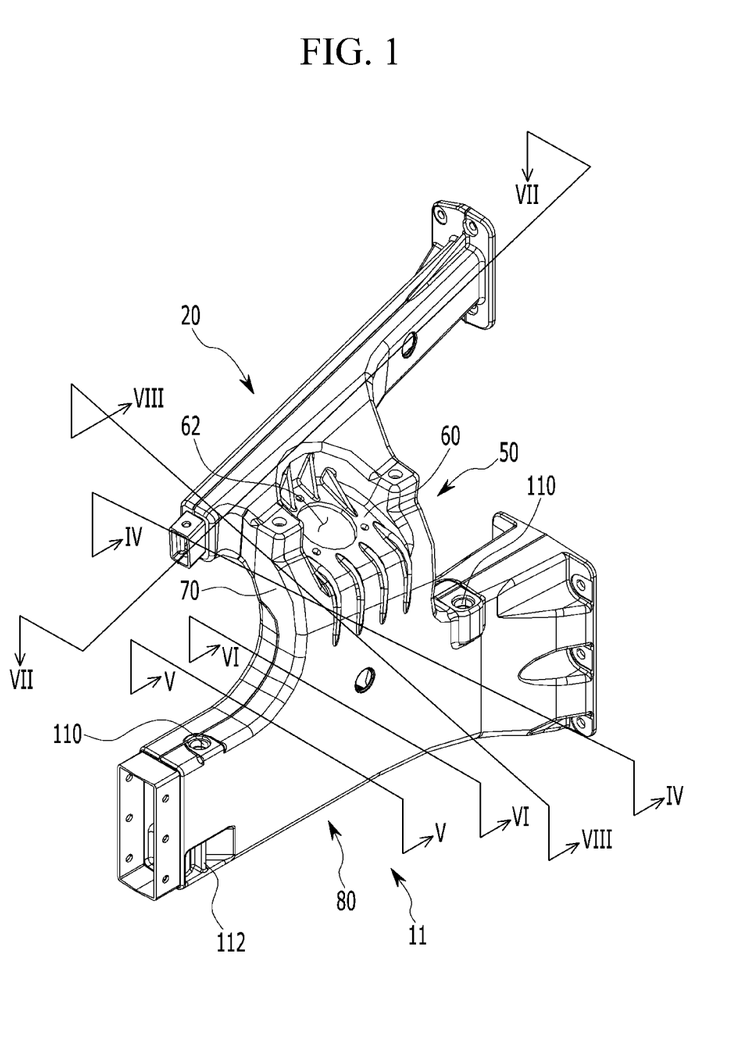
FIG. 1 is a partial perspective view of a casting vehicle body structure according to an exemplary embodiment of the present invention.
Figure 2:
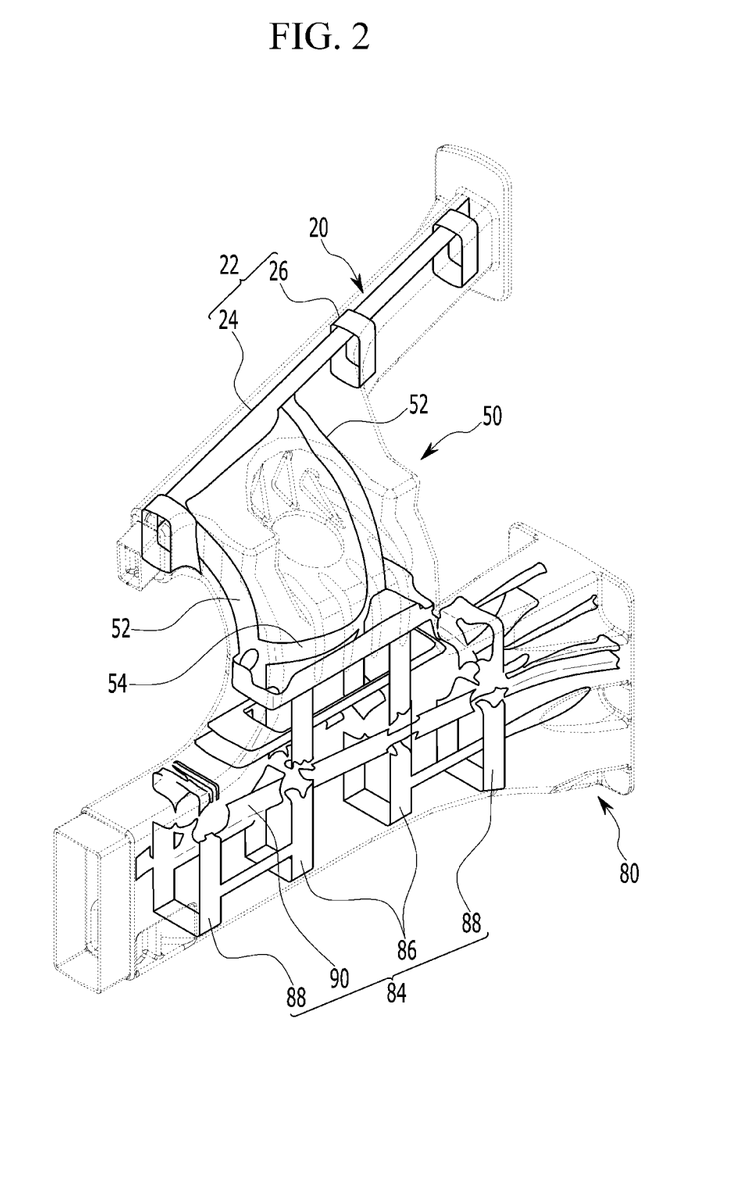
FIG. 2 is a perspective view showing a runner that may be applied to the casting vehicle body structure according to an exemplary embodiment of the present invention.

FIG. 1 is a partial perspective view of a casting vehicle body structure according to an exemplary embodiment of the present invention, and FIG. 2 is a perspective view showing a runner that may be applied to the casting vehicle body structure according to an exemplary embodiment of the present invention.

Referring to FIG. 1 and FIG. 2, a casting vehicle body structure according to an exemplary embodiment of the present invention may be applied to a vehicle body 11 including a fender apron upper member 20, a shock absorber housing 50 disposed under the fender apron upper member 20, and a front side member 80 disposed under the shock absorber housing 50.

On the front side member 80, a side member runner 84 may be formed to protrude from its inner surface.

Figure 3:
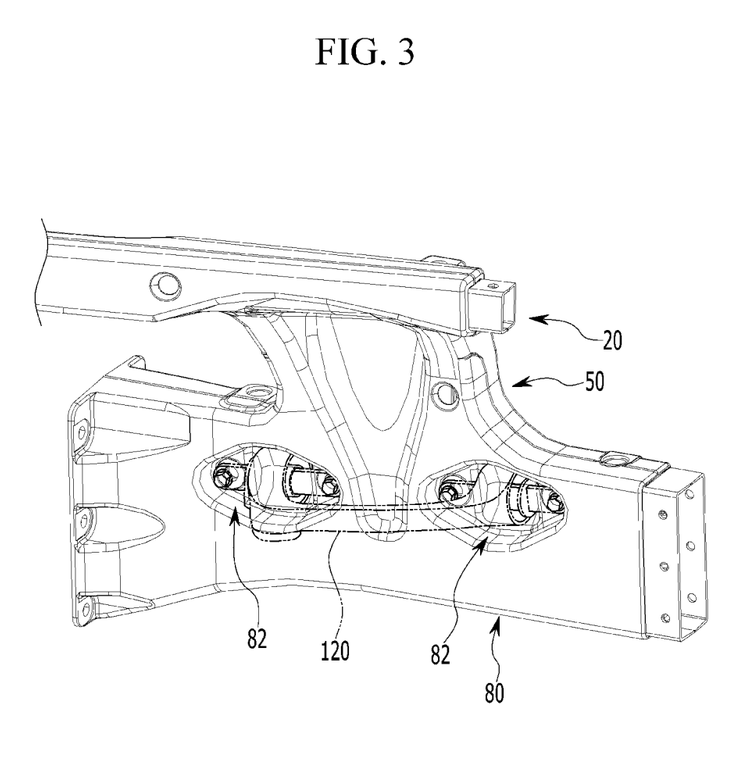
FIG. 3 is a partial perspective view of the casting vehicle body structure according to an exemplary embodiment of the present invention.
Figure 4:
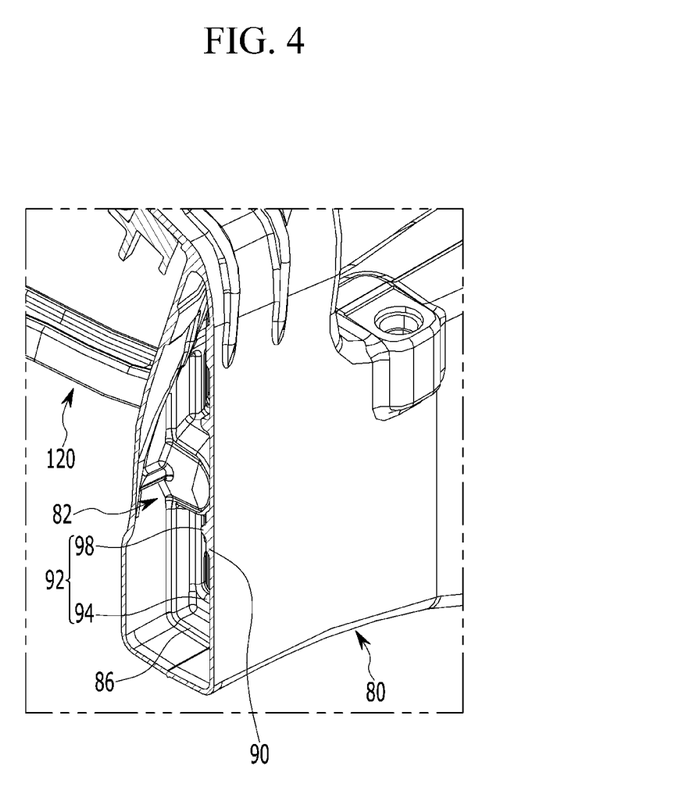
FIG. 4 is a cross-sectional view along the line IV-IV in FIG. 1.

FIG. 3 is a partial perspective view of the casting vehicle body structure according to an exemplary embodiment of the present invention, and FIG. 4 is a cross-sectional view along the line IV-IV in FIG. 1.

Referring to FIG. 1 to FIG. 4, a side member rib 92 may protrude from the side member runner 84.

A characteristic of cast parts is that as the material flows into the formwork, it begins to cool and harden when the melting point is reached.

The thicker the casting thickness, the smoother the flow of the molten metal and the lower the cooling speed, so the product quality is relatively good.

On the other hand, the thinner the casting thickness, the less smooth the flow of molten metal, the faster the cooling speed, and thus the product quality is relatively poor.

Therefore, as the thickness of the casting increases, the product properties improve, but the relative weight increases, and partial molten metal flow may be improved by applying ribs. However, if the cross-sectional area of the rib is large, a difference in cooling rate occurs and there is a risk of product defect.

In the casting vehicle body structure according to an exemplary embodiment of the present invention, the side member rib 92 is formed to protrude on the side member runner 84, so it is possible to improve the flow of molten metal and reduce the relative cross-section change, so that the cooling speed may be maintained stably to reduce the possibility of product defects. That is, the side member runner 84 facilitates the flow of molten metal, and the side member runner 84 together with the side member rib 92 forms a kind of double rib structure to reduce the relative cross-section change while stably maintaining the cooling speed.

A suspension upper arm mounting part 82 may be formed on the front side member 80, and as shown in FIG. 3 and FIG. 4, the suspension upper arm mounting part 82 may be formed to protrude in the inward direction of the front side member 80.

A suspension upper arm 120 may be mounted to the suspension upper arm mounting part 82, and a road load may be transmitted to the suspension upper arm mounting part 82 through the suspension upper arm 120.

The side member runner 84 may include a mounting part runner 86 formed to protrude from the inner surface of the suspension upper arm mounting part 82, and the side member rib 92 may include a mounting part rib 94 formed to protrude from the mounting part runner 86.

That is, by forming the mounting part runner 86 on the suspension upper arm mounting part 82 where the load may be concentrated, it is possible to improve the flowability of the molten metal around the forming position of the suspension upper arm mounting part 82 during casting. In addition, the mounting part rib 94 is formed to protrude from the mounting part runner 86, so that the mounting part rib 94 and the mounting part runner 86 may increase the strength of the suspension upper arm mounting part 82.

The mounting part runner 86 and the mounting part rib 94 may be formed in a lateral direction perpendicular to the length direction of the front side member 80.

Further, the mounting part runner 86 and the mounting part rib 94 may be formed and connected along a lateral direction perpendicular to the length direction of the front side member 80.

That is, referring to FIG. 2 and FIG. 4, the mounting part runner 86 is formed vertically in the length direction of the front side member 80 to increase the strength of the suspension upper arm mounting part 82 and improve the flowability of the molten metal in the vertical direction of the front side member 80. Therefore, uniform quality of products may be guaranteed.

In addition, the mounting part runner 86 and the mounting part rib 94 may be formed and connected in a vertical direction to the length direction of the front side member 80 to form a closed shape. Through this, it is possible to increase the strength in the vertical direction to the length direction of the front side member 80 to respond to the side-direction impact load.

Figure 5:
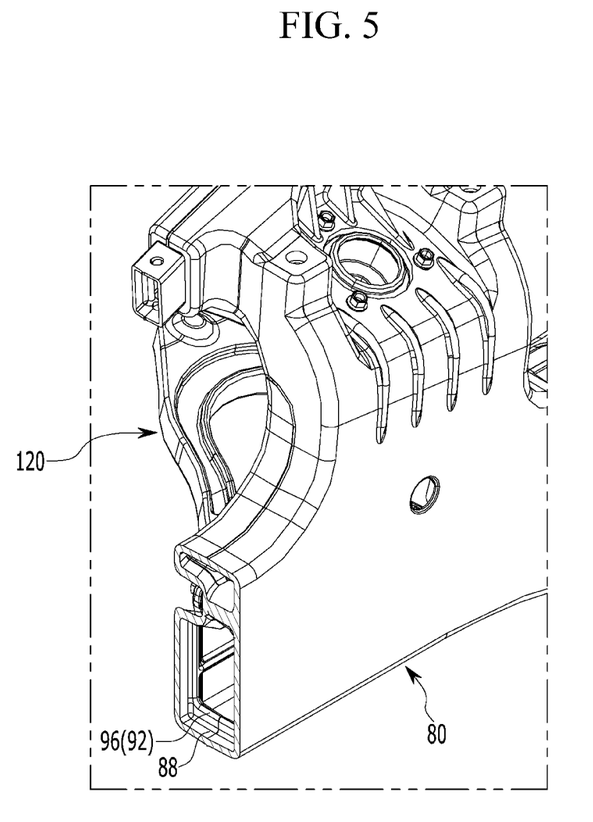
FIG. 5 is a cross-sectional view along the line V-V in FIG. 1.

FIG. 5 is a cross-sectional view along the line V-V in FIG. 1.

Referring to FIG. 1, FIG. 2 and FIG. 5, the side member runner 84 may further include a side member lateral direction runner 88 formed in a lateral direction vertical to the length direction of the front side member 80 on the inner surface of the front side member 80.

In addition, the side member rib 92 may further include a side member lateral direction rib 96 formed to protrude on the side member lateral direction runner 88.

A power train mounting part no for mounting a power train (not shown) may be formed on the front side member 80, and the side member lateral direction runner 88 is formed adjacent to the power train mounting part no to increase the strength of the power train mounting part 110.

The side member lateral direction runner 88 and the side member lateral direction rib 96 may be formed and connected along a lateral direction perpendicular to the length direction of the front side member 80.

That is, the side member lateral direction runner 88 and the side member lateral direction rib 96 are formed and connected in a direction vertical to the length direction of the front side member 80 to form a closed shape. And through this, it is possible to increase the strength in the vertical direction to the length direction of the front side member 80 to respond to the side-direction impact load.

Referring to FIG. 2 and FIG. 4, the side member runner 84 may further include a side member longitudinal direction runner 90 formed to protrude from the inner surface of the front side member 80 along the length direction of the front side member 80.

In addition, the side member rib 92 may further include a side member longitudinal direction rib 98 formed to protrude on the side member longitudinal direction runner 90.

The side member longitudinal direction rib 98 is formed in the length direction of the front side member 80 to facilitate the flow of molten metal along the length direction of the front side member 80, so that uniform quality along the length direction of the front side member 80 may be obtained. In addition, the side member longitudinal direction runner 90 and the side member longitudinal direction rib 98 may increase the strength according to the length direction of the front side member 80, so that it is possible to respond to the frontal impact load of the vehicle body.

In addition, the side member longitudinal direction runner 90 may transmit the flow of molten metal to the mounting part runner 86 and the side member lateral direction runner 88, so uniform quality of the front side member 80 may be secured.

Figure 6:
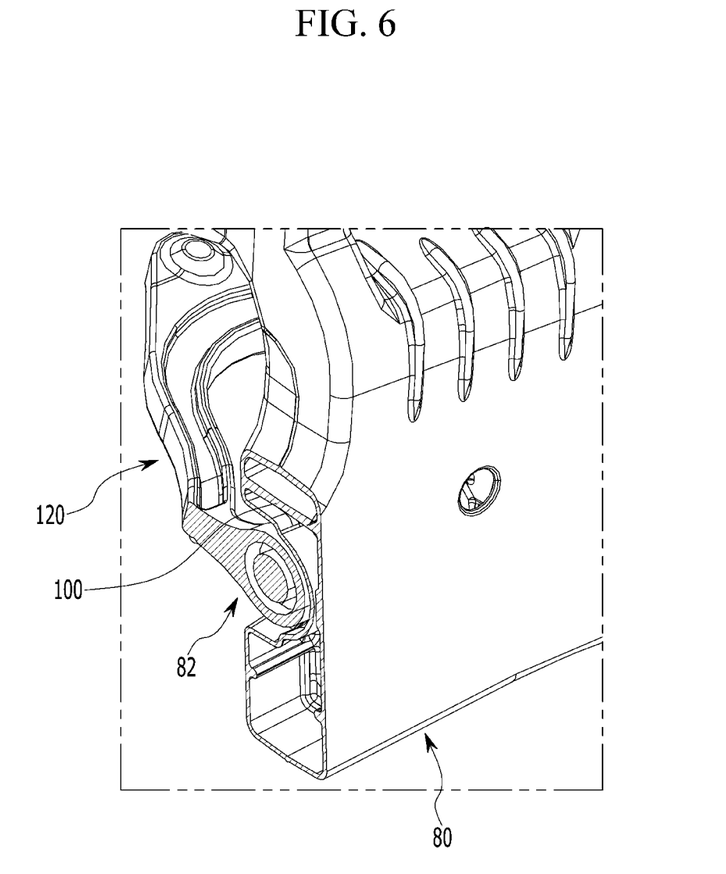
FIG. 6 is a cross-sectional view along the line VI-VI in FIG. 1.

FIG. 6 is a cross-sectional view along the line VI-VI in FIG. 1.

Referring to FIG. 6, the casting vehicle body structure according to an exemplary embodiment of the present invention may further include an upper arm mounting part reinforcement plate 100 formed to protrude adjacent to the suspension upper arm mounting part 82.

The upper arm mounting part reinforcement plate 100 may be formed adjacent to the suspension upper arm mounting part 82 to further increase the strength of the suspension upper arm mounting part 82.

Figure 7:
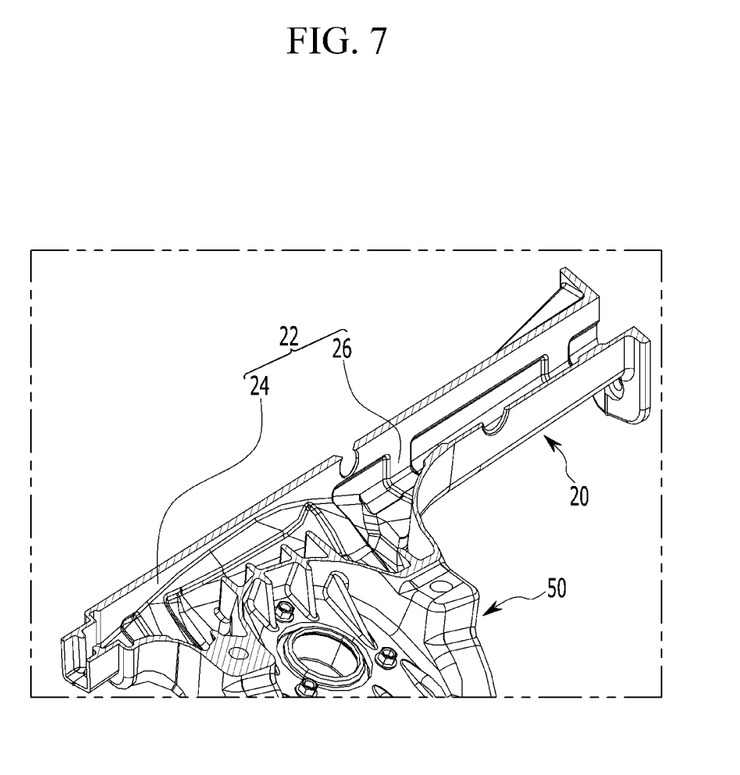
FIG. 7 is a cross-sectional view along the line VII-VII in FIG. 1.

FIG. 7 is a cross-sectional view along the line VII-VII in FIG. 1.

Referring to FIG. 1, FIG. 2 and FIG. 7, the casting vehicle body structure according to an exemplary embodiment of the present invention may further include an upper member runner 22 formed to protrude from the inner surface of the fender apron upper member 20.

The upper member runner 22 may include an upper member longitudinal direction runner 24 formed to protrude along the length direction of the fender apron upper member 20.

The upper member longitudinal direction runner 24 facilitates the flow of molten metal along the length direction of the fender apron upper member 20 to ensure uniform quality of the fender apron upper member 20.

The upper member runner 22 may further include an upper member lateral direction runner 26 formed and connected along a lateral direction vertical to the length direction of the fender apron upper member 20.

The upper member lateral direction runner 26 facilitates the flow of molten metal in the vertical direction to the length direction of the fender apron upper member 20, thereby ensuring uniform quality of the fender apron upper member 20.

In addition, the upper member longitudinal direction runner 24 and the upper member lateral direction runner 26 may be connected, and it is possible to secure uniform quality of the fender apron upper member 20 by smoothing the flow of molten metal from the upper member longitudinal direction runner 24 to the upper member lateral direction runner 26.

Figure 8:
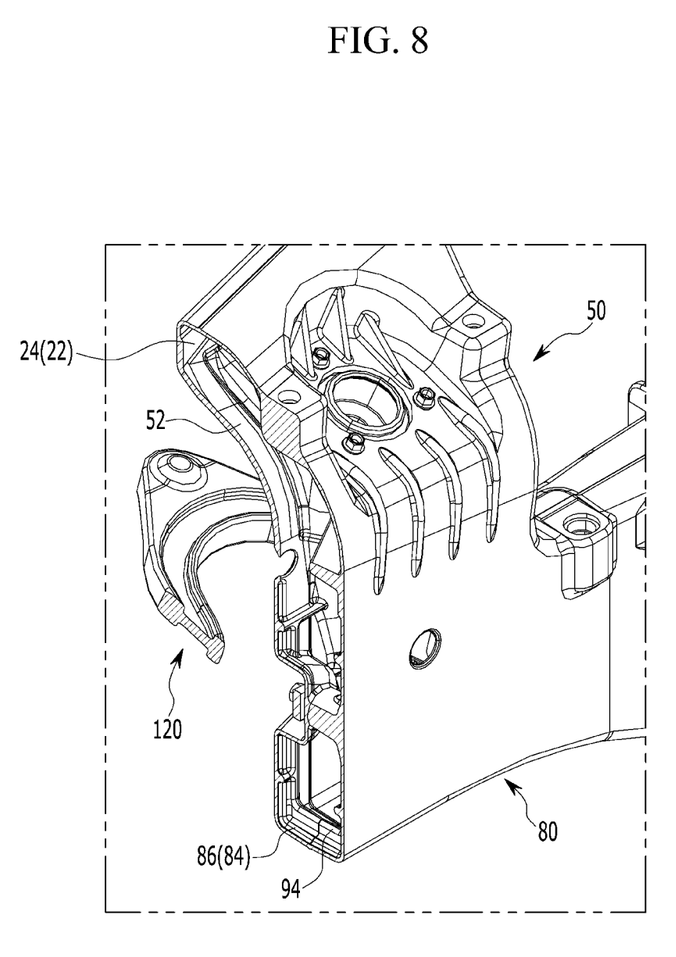
FIG. 8 is a cross-sectional view along the line VIII-VIII in FIG. 1.

FIG. 8 is a cross-sectional view along the line VIII-VIII in FIG. 1.

Referring to FIG. 1, FIG. 2 and FIG. 8, the casting vehicle body structure according to an exemplary embodiment of the present invention may further include a housing runner 52 formed to protrude from the inner surface of the shock absorber housing 50.

The housing runner 52 may be configured to connect the upper member runner 22 and the side member runner 84.

The housing runner 52 may smooth the flow of molten metal in the shock absorber housing 50 and increase the strength of the shock absorber housing 50. In addition, the housing runner 52 connects the upper member runner 22 and the side member runner 84 so that the molten metal of the front side member 80 may be uniformly transmitted from the fender apron upper member 20.

The housing runner 52 may be formed in two along both sides of the shock absorber housing 50.

That is, the shock absorber housing 50 may be formed with a shock absorber mounting part 60, and the shock absorber mounting part 60 may be formed with a shock absorber mounting hole 62 for mounting the shock absorber, so that strength reinforcement against the impact of road load is required.

The housing runner 52 is formed along both sides of the shock absorber housing 50, and the casting vehicle body structure according to an exemplary embodiment of the present invention may further include a housing connection runner 54 formed to connect each of the housing runners 52.

That is, the housing connection runner 54 may connect each of the housing runners 52 to increase the strength of the shock absorber housing 50, and it is possible to secure uniform quality of the shock absorber housing 50.

The fender apron upper member 20, the shock absorber housing 50 and the front side member 80 may be integrally formed. Through this, the process of forming the fender apron upper member 20, the shock absorber housing 50 and the front side member 80 may be simplified, and the entire strength of the fender apron upper member 20, the shock absorber housing 50 and the front side member 80 may be increased.

In addition, the upper member runner 22, the housing runner 52 and the side member runner 84 are connected so that the molten metal flows smoothly and uniform molten metal transfer is possible.

Figure 9A:
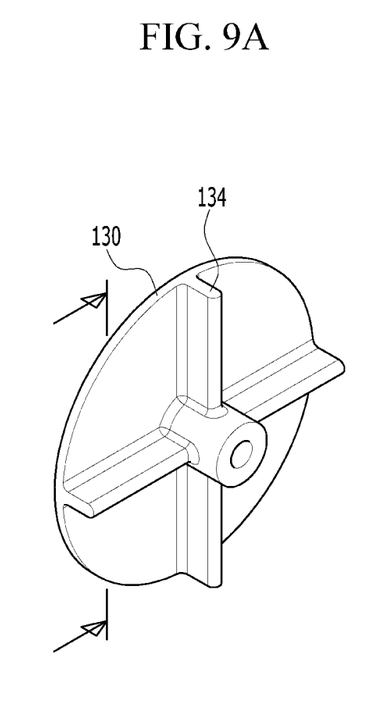
FIG. 9A, FIG. 9B, FIG. 10A and FIG. 10B are comparative drawings of a general casting vehicle body structure and a casting vehicle body structure according to an exemplary embodiment of the present invention.
Figure 9B:
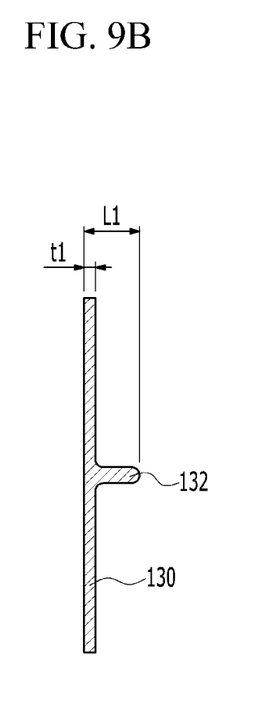
Figure 10A:
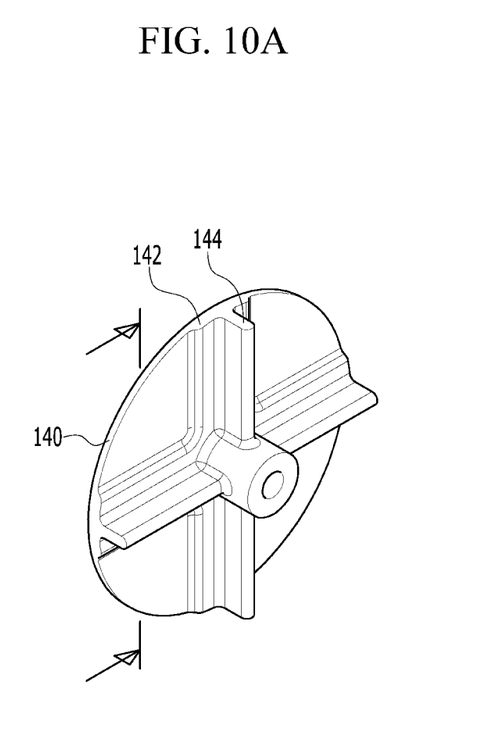
Figure 10B:
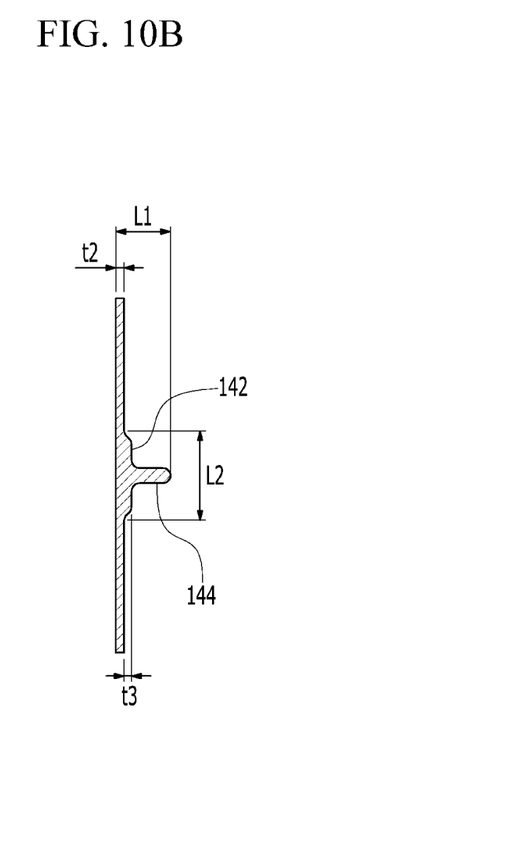
Figure 11:
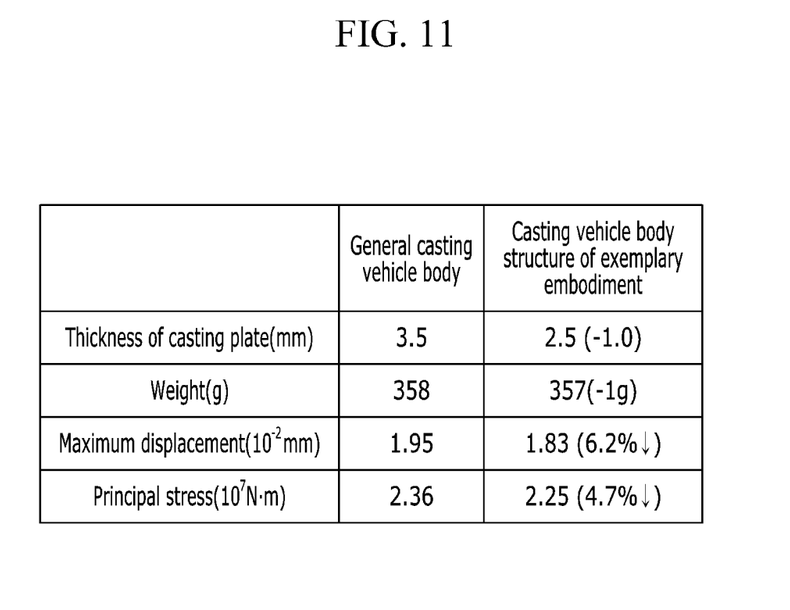
FIG. 11 is a strength analysis result comparing the general casting vehicle body structure and the casting vehicle body structure according to an exemplary embodiment of the present invention.

FIG. 9A, FIG. 9B, FIG. 10A and FIG. 10B are comparative drawings of a general casting vehicle body structure and a casting vehicle body structure according to an exemplary embodiment of the present invention, and FIG. 11 is a strength analysis result comparing the general casting vehicle body structure and the casting vehicle body structure according to an exemplary embodiment of the present invention.

In FIG. 9 and FIG. 10, the casting plate 130 that may be applied to the general casting vehicle body structure and the casting plate 140 that may be applied to the casting vehicle body structure according to an exemplary embodiment of the present invention may be a circular plate having the same diameter.

The casting plate 130, which may be applied to a general casting vehicle body structure, has a first thickness t1, and a reinforcing rib 132 may be formed to protrude from the casting plate 130. The entire thickness of the reinforcing rib 132 from the casting plate 130 may be defined as L1.

The casting plate 140 that may be applied to the casting vehicle body structure according to an exemplary embodiment of the present invention has a second thickness t2, a runner 142 protrudes from the casting plate 140, and a rib 144 may be formed to protrude from the runner 142. The thickness of the runner 142 may be defined as t3 and the width of the runner 142 may be defined as L2. Here, t3 may be 3 mm, and L2 may be 30 mm, but the disclosure is not limited thereto.

In addition, the entire thickness of the rib 144 from the casting plate 140 may be the same as the entire thickness of the casting plate 130 that may be applied to the general casting vehicle body structure as L1.

As shown in FIG. 11, the casting plate 140, which can be applied to the casting vehicle body structure according to embodiments of the present invention, may reduce the thickness by about 1 mm, reduce the maximum displacement by about 6.2% and reduce the principal stress by about 4.7% while maintaining the entire weight at the same level.

That is, according to the casting vehicle body structure according to an exemplary embodiment of the present invention, it is possible to improve the flow of molten metal through the runner and the rib formed to protrude from the runner, ensure uniform quality of the composition, and increase strength while maintaining the entire weight.

In addition, according to the casting vehicle body structure according to an exemplary embodiment of the present invention, it is possible to minimize the assembly connection structure between the pails, and to simultaneously assemble several peripheral pails, and to simplify the layout.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A casting vehicle body structure comprising:
   a fender apron upper member;
   a shock absorber housing disposed under the fender apron upper member;
   a front side member disposed under the shock absorber housing;
   a side member runner protruding from an inner surface of the front side member;
   a side member rib protruding from the side member runner; and
   a housing runner protruding from an inner surface of the shock absorber housing.

2. The casting vehicle body structure of claim 1, further comprising a suspension upper arm mounting part disposed on the front side member, wherein the side member runner comprises a mounting part runner that protrudes from an inner surface of the suspension upper arm mounting part, and wherein the side member rib comprises a mounting part rib that protrudes from the mounting part runner.

3. The casting vehicle body structure of claim 2, wherein the mounting part runner and the mounting part rib are disposed in a lateral direction perpendicular to a length direction of the front side member.

4. The casting vehicle body structure of claim 2, wherein the mounting part runner and the mounting part rib are disposed and connected along a lateral direction perpendicular to a length direction of the front side member.

5. The casting vehicle body structure of claim 2, wherein:
the side member runner comprises a side member longitudinal direction runner that protrudes from the inner surface of the front side member along a length direction of the front side member; and
the side member rib comprises a side member longitudinal direction rib that protrudes on the side member longitudinal direction runner.

6. The casting vehicle body structure of claim 2, further comprising an upper arm mounting part reinforcement plate that protrudes adjacent to the suspension upper arm mounting part.

7. The casting vehicle body structure of claim 1, wherein:
the side member runner comprises a side member lateral direction runner disposed in a lateral direction vertical to a length direction of the front side member on the inner surface of the front side member; and
the side member rib comprises a side member lateral direction rib that protrudes on the side member lateral direction runner.

8. The casting vehicle body structure of claim 7, wherein the side member lateral direction runner and the side member lateral direction rib are disposed and connected along a lateral direction perpendicular to the length direction of the front side member.

9. A casting vehicle body structure comprising:
a fender apron upper member;
a shock absorber housing disposed under the fender apron upper member;
a front side member disposed under the shock absorber housing;
a side member runner protruding from an inner surface of the front side member;
a side member rib protruding from the side member runner;
an upper member runner protruding from an inner surface of the fender apron upper member; and
a housing runner protruding from an inner surface of the shock absorber housing and connecting the upper member runner and the side member runner.

10. The casting vehicle body structure of claim 9, wherein the upper member runner comprises an upper member longitudinal direction runner that protrudes along a length direction of the fender apron upper member.

11. The casting vehicle body structure of claim 10, wherein the upper member runner comprises an upper member lateral direction runner disposed and connected along a lateral direction vertical to the length direction of the fender apron upper member.

12. The casting vehicle body structure of claim 9, wherein:
the housing runner is formed in two along both sides of the shock absorber housing; and
the casting vehicle body structure further comprises a housing connection runner connecting the housing runners.

13. The casting vehicle body structure of claim 9, wherein the fender apron upper member, the shock absorber housing, and the front side member are integrally formed.

14. A method of forming a casting vehicle body structure, the method comprising:
casting a fender apron upper member;
casting a shock absorber housing to be disposed under the fender apron upper member;
casting a front side member to be disposed under the shock absorber housing, wherein a side member runner protrudes from an inner surface of the front side member and a side member rib protrudes from the side member runner; and
forming a housing runner that protrudes from an inner surface of the shock absorber housing.

15. The method of claim 14, further comprising forming a suspension upper arm mounting part to be disposed on the front side member, wherein the side member runner comprises a mounting part runner that protrudes from an inner surface of the suspension upper arm mounting part, and wherein the side member rib comprises a mounting part rib that protrudes from the mounting part runner.

16. The method of claim 15, wherein:
the side member runner comprises a side member longitudinal direction runner that protrudes from the inner surface of the front side member along a length direction of the front side member; and
the side member rib comprises a side member longitudinal direction rib that protrudes on the side member longitudinal direction runner.

17. The method of claim 15, further comprising forming an upper arm mounting part reinforcement plate that protrudes adjacent to the suspension upper arm mounting part.

18. The casting vehicle body structure of claim 9, further comprising a suspension upper arm mounting part disposed on the front side member, wherein the side member runner comprises a mounting part runner that protrudes from an inner surface of the suspension upper arm mounting part, and wherein the side member rib comprises a mounting part rib that protrudes from the mounting part runner.

19. The casting vehicle body structure of claim 18, wherein the mounting part runner and the mounting part rib are disposed in a lateral direction perpendicular to a length direction of the front side member.

20. The casting vehicle body structure of claim 18, wherein the mounting part runner and the mounting part rib are disposed and connected along a lateral direction perpendicular to a length direction of the front side member.

* * * * *